US006373989B1

(12) United States Patent
Fukuhara et al.

(10) Patent No.: US 6,373,989 B1
(45) Date of Patent: Apr. 16, 2002

(54) ITERATED IMAGE TRANSFORMATION AND DECODING APPARATUS AND METHOD, AND RECORDING MEDIUM

(75) Inventors: Takahiro Fukuhara; Akio Ohba, both of Kanagawa (JP)

(73) Assignees: Sony Corporation; Sony Computer Entertainment Inc., both of Tokyo (JP)

( * ) Notice: Subject to any disclaimer, the term of this patent is extended or adjusted under 35 U.S.C. 154(b) by 0 days.

(21) Appl. No.: 09/175,392

(22) Filed: Oct. 19, 1998

(30) Foreign Application Priority Data

Oct. 22, 1997 (JP) .............................. 9-290035

(51) Int. Cl.[7] ................................. G06K 9/36
(52) U.S. Cl. .................. 382/241; 382/243; 345/441
(58) Field of Search ................................ 382/241, 243, 382/233, 232; 345/441; 708/203

(56) References Cited

U.S. PATENT DOCUMENTS 4,941,193 A * 7/1990 Barnsley et al. ............ 382/249
5,065,447 A * 11/1991 Barnsley et al. ............ 382/249
5,347,600 A * 9/1994 Barnsley et al. ............ 382/249
5,867,221 A * 2/1999 Pullen et al. ............ 375/240.16

OTHER PUBLICATIONS

Image Coding Based on a Fractal Theory of Iterated Contractive Image Transformations, IEEE Jan. 1992.*

* cited by examiner

Primary Examiner—Bhavesh Mehta
Assistant Examiner—Ali Bayat
(74) Attorney, Agent, or Firm—Frommer Lawrence & Haug LLP; William S. Frommer; Gordon Kessler

(57) ABSTRACT

An iterated image transformation and decoding apparatus and method, and a recording medium are provided. The iterated image transformation and decoding apparatus includes two polygon information generation devices for unscrambling an input coded bit stream, inputting aspect-ratio information, and reconstructing information for generating two different polygonal images; an image transformation and generation device for mapping-transforming the pixel value of an image within one of the polygons and the position of the polygon; an image memory device for storing the transformed polygonal image; and a control device for performing control so that the mapping transformation and generation of the polygon is iteratively processed. This makes it possible to provide a decoded image having a predetermined aspect ratio without a filtering process or the like which is required conventionally.

16 Claims, 9 Drawing Sheets

FIG. 7
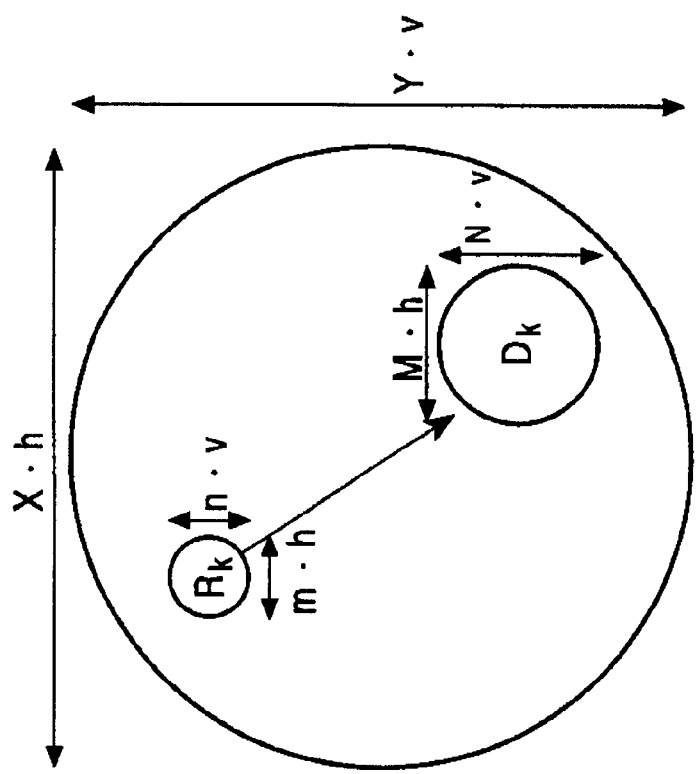
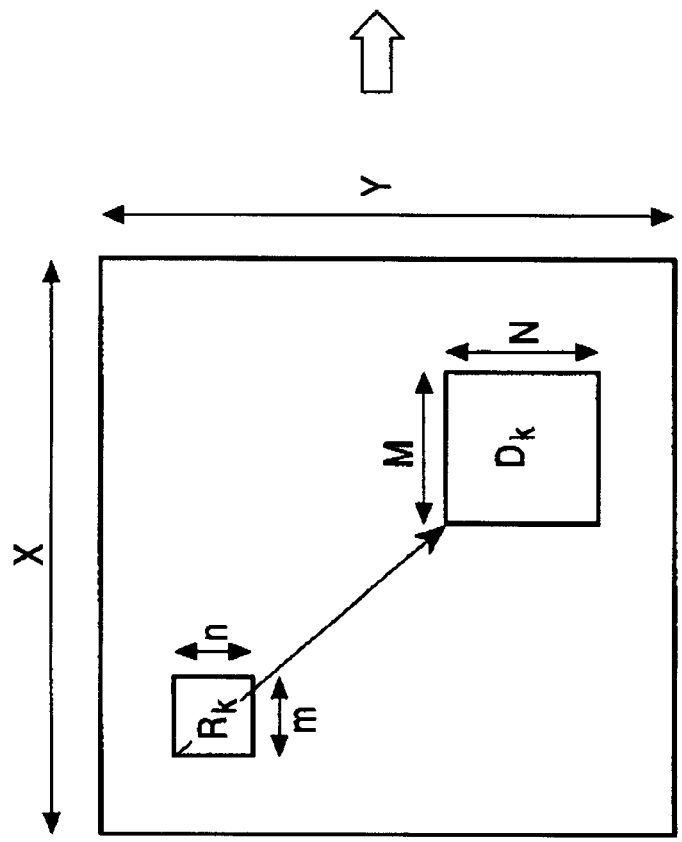

ITERATED IMAGE TRANSFORMATION AND DECODING APPARATUS AND METHOD, AND RECORDING MEDIUM

BACKGROUND OF THE INVENTION

1. Field of the Invention

The present invention relates to an iterated image transformation and decoding apparatus and method, and a recording medium. More particularly, the present invention relates to an iterated image transformation and decoding apparatus and method which, by using iterated transformation, decodes a coded bit stream output from a coder for an image which is provided to a system which performs low-rate-coding of an image, or efficient transmission or storage of an image, and a recording medium.

2. Description of the Related Art

As a typical conventional image compression method, a commonly called JPEG (Joint Photographic Coding Experts Group) method standardized by the ISO is known. This JPEG method uses DCT (Discrete Cosine Transform), and when a relatively high bit rate is assigned, provides a satisfactory coded/decoded image. However, if the number of coding bits is reduced to some degree, block distortion which is characteristic of the DCT become conspicuous, and image degradation becomes noticeable.

In addition to this, recently, an image compression method using an iterated function system (IFS) is beginning to attract attention. This method utilizes self-similarity of an image under the precondition that when a part of an image is taken out from the entire image, another image which closely resembles the taken-out image is present in the form of a different size within the image. In this iterated function system, the block distortion such as that of the above-described JPEG is not conspicuous, and the self-similarity among the blocks of different sizes within the image is utilized, yielding the advantage that there is no dependence upon the resolution during decoding. This iterated transformation coding is also called fractal coding, and applications to various fields are expected.

The basic construction of the above-described iterated transformation coding is shown in, for example, "Image coding based on a fractal theory of Iterated Contractive Image Transformations" by Arnaud E. Jacquin, IEEE Transactions on Image Processing, Vol.1, No.1, pp.18–30. The iterated transformation and coding apparatus shown herein is shown in FIG. 9, and the iterated transformation and decoding apparatus shown herein is shown in FIG. 10.

The iterated transformation and coding apparatus will be described first with reference to FIG. 9.

An original image 300 supplied to this iterated transformation and coding apparatus of FIG. 9 is input to a block generation circuit 200 where it is divided into a plurality of blocks 301. These blocks are set so as not to overlap each other. Also, reduced images 307 obtained by reducing the original image 300 by a reduced-image generation circuit 202 are stored in a reduced-image storing circuit 204. For the divided blocks 301, in an approximation area search circuit 201, reduced images are searched in a full search within the reduced-image storing circuit 204 and the most closely resembling reduced image is detected from among the reduced images. Approximation block position information 306, obtained hereby, indicating which portion of the reduced image should be extracted, is transmitted to the reduced image storing circuit 204, and a reduced image 305 of a specified area is taken out. Then, the reduced image 305 of the specified area is subjected to, for example, rotation/reverse/level-value conversion in accordance with a transformation parameter 304 in a rotation/reverse/level-value conversion section 203, and a reduced image 303 after being transformed is output. As a result, the transformation parameter 304 and the approximation block position information 306 are output as an iterated function system (IFS) code 302.

Next, a description will be given of the iterated transformation and decoding apparatus with reference to FIG. 10.

The IFS code 302 output from the iterated transformation and coding apparatus of FIG. 9 is once input to an IFS code storing circuit 205 and stored therein. The IFS code 302 is read therefrom sequentially in block units for a plurality of times. An IFS code reading circuit 206 reads an IFS code 308 in block units and separates it into the approximation block position information 306 and the transformation parameter 304. Then, the approximation block position information 306 is input to a reduced-image storing circuit 210, and the reduced image 305 of the specified area is taken out from the reduced image in accordance with the position information 306. This reduced image 305 of the specified area is subjected to a transformation process based on the transformation parameter 304 by the rotation/reverse/level-value conversion section 203, is added and copied onto the decoded image within a decoded-image storing circuit 208 and is stored. When the IFS code reading circuit 206 completes the reading of the IFS code 308 of all the blocks, the IFS code reading circuit 206 sends a reading completion notification signal 310 to a copying control circuit 207. This copying control circuit 207 measures the number of times a series of the above copying process has been performed. When the number does not reach a preset value, a re-reading instruction signal 309 is output to the IFS code reading circuit 206, and the copying process is performed again on all the blocks of the image. At the same time, re-processing instruction information is sent in accordance with a decoded-image output control signal 311, and a decoded image 313 is connected, by a switch 209, to an input 314 with respect to the reduced-image generation circuit 202. The reduced-image generation circuit 202 generates a reduced image 315 in exactly the same manner as on the coder side, and the contents of the image stored in the reduced-image storing circuit 204 are replaced with this image. When, on the other hand, the copying process has reached a fixed number of times, the copying control circuit 207 issues a termination instruction in accordance with a decoded-image output control signal 311, the decoded image 313 is connected to a final output image 316 by a switch 209, and an output of the decoder is obtained.

In an example of conventional technology such as that described above, the approximation with respect to an image obtained by performing a reduction and transformation process on a block at an arbitrary place of the self entire image screen is measured. The position information of the most closely resembling block and the transformation parameter at that time are selected from all possible candidates. As a result, in the coder, a coded code is written into the bit stream in the sequence of the coded block.

Meanwhile, in the decoder, the coded bit stream is unscrambled, and a decoded image having the same size or the same aspect ratio as that of the input image on the coder side is output. However, in a texture mapping process (pasting of texture) for a three-dimensional shape, often used recently in CG (computer graphics), etc., three-dimensional shapes can take various forms and therefore, it is necessary to match the image with the shape.

In such a case, conventionally, the common practice is that by performing a filtering process, etc. on an image which is decoded once again, its aspect ratio is changed. If this changing of the aspect ratio can be performed at the same time as the decoding, the texture mapping process, etc., in CG can be simplified greatly.

SUMMARY OF THE INVENTION

An object of the present invention, which has been achieved in view of such circumstances, is to provide an iterated image transformation and decoding apparatus and method, in which changing of the aspect ratio can be performed at the same time as decoding without using a filtering process or the like during decoding, and a recording medium.

To achieve the above-mentioned object, according to one aspect of the present invention, there is provided an iterated image transformation and decoding apparatus comprising: two polygon information generation means for unscrambling a coded bit stream, inputting aspect-ratio information, and reconstructing information for generating two different polygonal images; image transformation and generation means for mapping-transforming the pixel value of an image within one of the polygons and the position of the polygon; image memory means for storing the transformed polygonal image; and control means for performing control so that the mapping transformation and generation of the polygon is iteratively processed.

With such a construction, the first polygon information generation means inputs aspect-ratio information and reconstructs the position information of a polygon of a mapping transformation target. Similarly, the second polygon information generation means inputs aspect-ratio information and reconstructs the position information of a polygon of a mapping transformation source. The image transformation and generation means performs a predetermined mapping transformation process on all the pixels of a second polygonal image in order to generate a new polygonal image. The image memory means stores the transformed polygonal image. The control means controls an iteration process of a decoding loop so that a final decoded image is output.

According to another aspect of the present invention, there is provided an iterated image transformation and decoding apparatus comprising: two polygon information generation means for unscrambling a coded bit stream and reconstructing information for generating two different polygonal images; two polygon transformation and generation means for inputting polygon deformation information in order to deform and generate a polygon; image transformation and generation means for mapping-transforming the pixel value of an image within one of the deformed polygons and the position of the polygon; image memory means for storing the mapping-transformed polygonal image; and control means for performing control so that the mapping transformation and generation of the polygon is iteratively processed.

With such a construction, the first polygon information generation means unscrambles a coded bit stream and reconstructs the position information of a polygon of a mapping transformation target. The second polygon information generation means unscrambles a coded bit stream and reconstructs the position information of a polygon of a mapping transformation source. The first polygon deformation and generation means inputs polygon deformation information and deforms a first polygon in order to generate a new polygonal image. The second polygon deformation and generation means inputs polygon deformation information and deforms a second polygon in order to generate a new polygonal image.

The above and further objects, aspects and novel features of the invention will become more apparent from the following detailed description when read in connection with the accompanying drawings.

BRIEF DESCRIPTION OF THE DRAWINGS

FIG. 7 is a view showing an example in which decoding which accompanies deformation from a regular square into a circular shape is performed.

DESCRIPTION OF THE PREFERRED EMBODIMENTS

A description will be given below of embodiments of the present invention with reference to the accompanying drawings.

Figure 1:
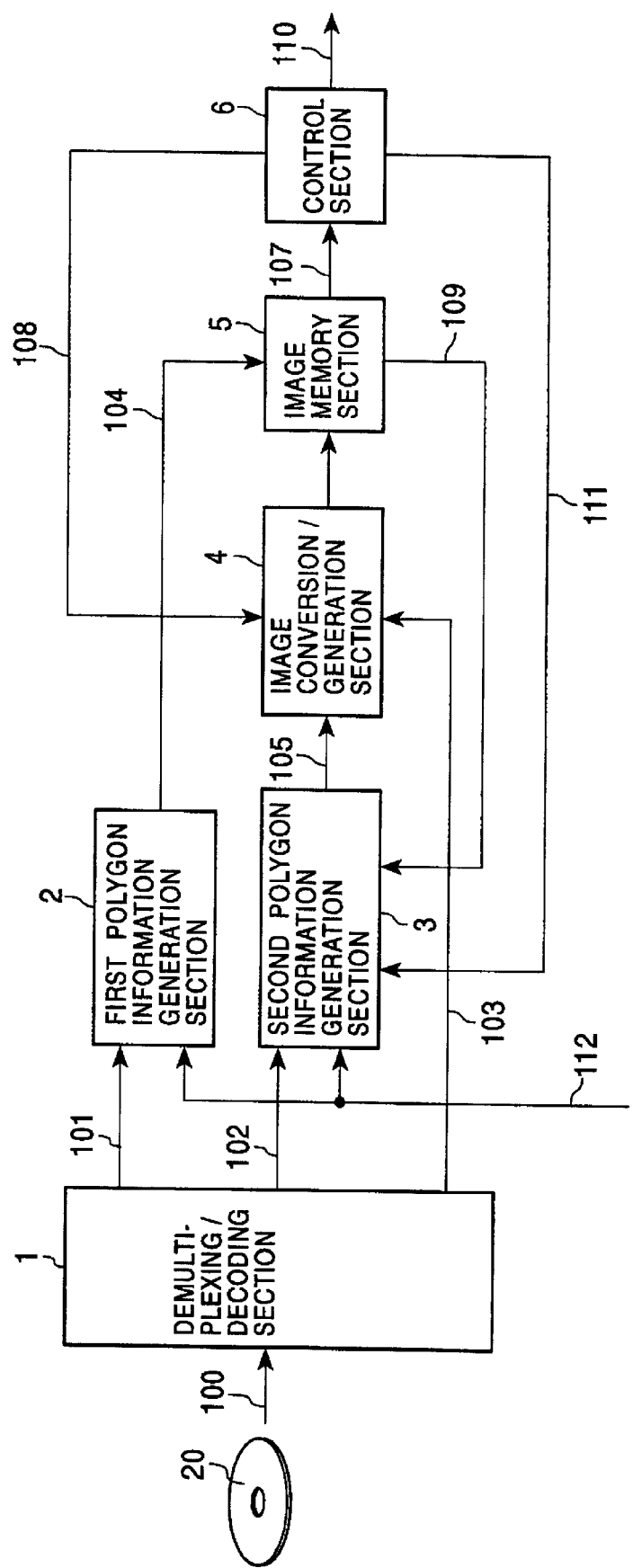
FIG. 1 is a block diagram schematically showing the construction of an iterated image transformation and decoding apparatus of an aspect-ratio variable type, which is a first embodiment of the present invention.

FIG. 1 is a block diagram showing the construction of an iterated image transformation and decoding apparatus of an aspect-ratio variable type, which is a first embodiment of the present invention.

This iterated image transformation and decoding apparatus shown in FIG. 1 comprises a demultiplexing/decoding section 1 for demultiplexing an input coded bit stream 100 and decoding it, first and second polygon information generation sections 2 and 3 for unscrambling each of the demultiplexed input coded bit streams, inputting aspect-ratio information, and reconstructing information for generating first and second polygonal images, an image transformation and generation section 4 for mapping-transforming the pixel value of the image within a polygon from the second polygon information generation section 3 and the position of the polygon, an image memory section 5 for storing and holding the transformed polygonal image at the transformed position, and a control section 6 for performing control so that the mapping transformation and generation of the polygon is iteratively processed.

Next, the operation thereof will be described.

In FIG. 1, a coded bit stream 100 obtained as a result of iterated transformation by the iterated transformation and coding apparatus is input by, for example, reproduction from a recording medium 20, such as a disk, or as a result of being transmitted through a transmission medium. This coded bit stream 100 is demultiplexed by the demultiplexing/decoding section 1, and each of the demultiplexed coded codes is decoded as required in order to reconstruct the original information. When the coded bit stream 100 is data which is not multiplexed, it is a matter of course that the demultiplexing/decoding section 1 can be omitted. However, when it is considered from the point of view of data transmission efficiency, the demultiplexing/decoding section 1 is often used.

Next, the number or address 101 of the first polygonal image output from the demultiplexing/decoding section 1 and the number or address 102 of the second polygonal image are input to the first polygon information generation section 2 and the second polygon information generation section 3, respectively. In the first polygon information generation section 2, based on the number or address 101 of the first polygonal image and aspect-ratio information 112, first polygonal-image information 104 is output. The information for this case is generally the position coordinates of the polygonal image. Next, in the second polygon information generation section 3, based on the number or address 102 of the second polygonal image and the aspect-ratio information 112, the image information of the position at which the second polygonal image is present within the image memory section 5 is input as a second polygonal image 109, and second polygonal-image information 105 is output. At this time, the second polygonal-image information 105 has both the information for the position at which the second polygonal image is present and the pixel value within the image.

In the image transformation and generation section 4 to which the second polygonal-image information 105 has been input, based on the transformation parameter 103 input from the demultiplexing/decoding section 1, predetermined mapping transformation is performed on the pixel value within the second polygonal image, and a transformed polygonal image 106 is output. Then, the polygonal image 106 is written at the position indicated by the first polygonal-image information 104 within the image memory section 5. When the decoding of the polygonal image within a part of or the entirety of the coded bit stream 100 is completed, a decoded image 107 is output from the image memory section 5 to the control section 6. The control section 6, which is at the termination of the iterated decoding loop, performs the decoding loop control. Therefore, when the decoding loop is performed again by the control section 6, a control signal 111 is output to the second polygon information generation section 3, so that the decoding is continued. The pixel value stored in the image memory section 5 is overwitten each time of the decoding loop. Therefore, in the initial state of the decoding loop, the pixel value stored in the image memory section 5 may be any value. Meanwhile, when the decoding loop is terminated, a final decoded image 110 is output from the control section 6.

Figure 2:
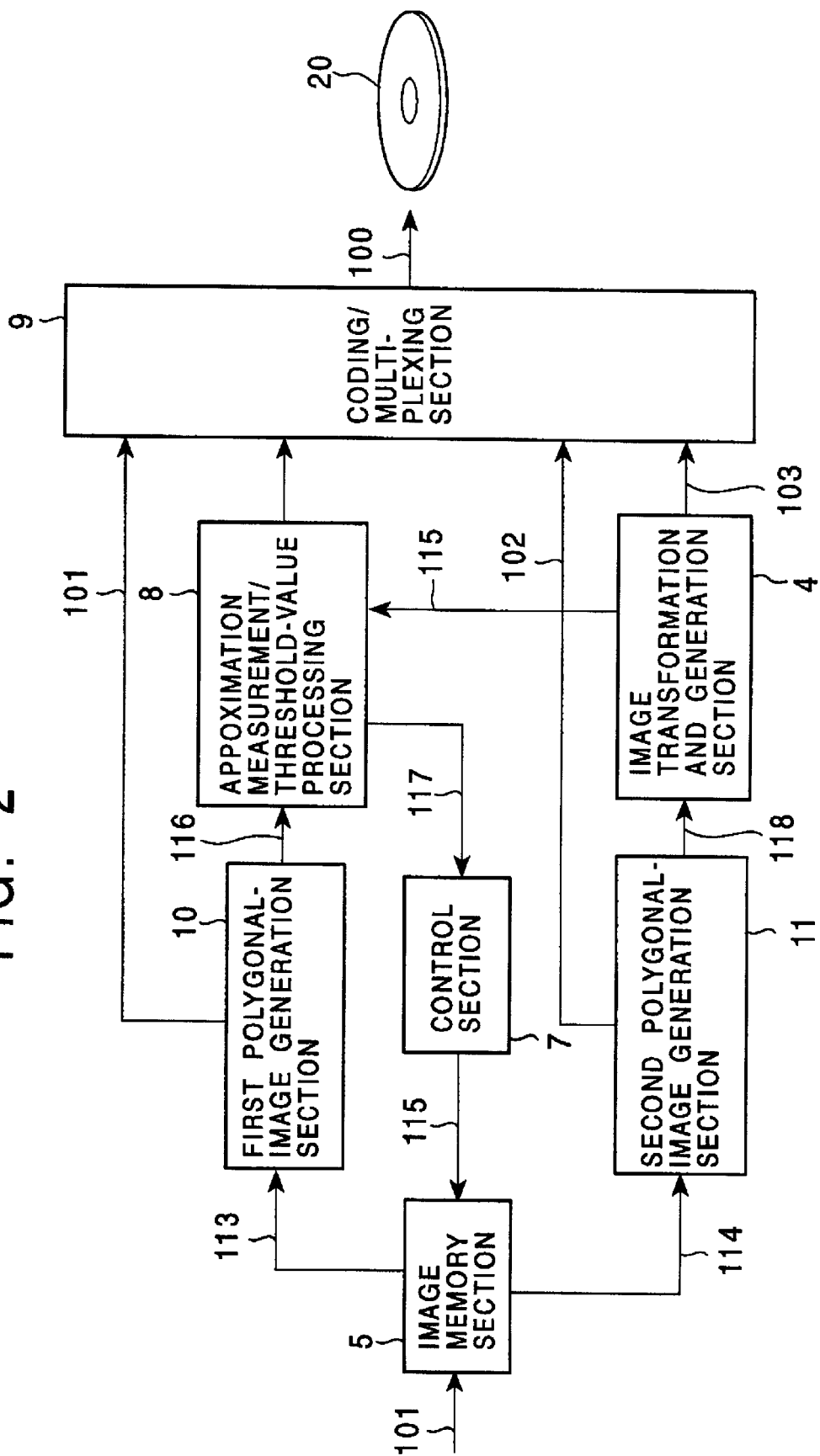
FIG. 2 is a block diagram schematically showing the construction of an iterated transformation and coding apparatus corresponding to the iterated transformation and decoding apparatus of FIG. 1.

Next, FIG. 2 shows an example of the construction of an iterated transformation and coding apparatus corresponding to the image transformation decoding apparatus of the above-described first embodiment shown in FIG. 1.

This iterated image transformation and coding apparatus shown in FIG. 2 comprises an image memory section 5, a control section 7, a first polygonal-image generation section 10, a second polygonal-image generation section 11, an image transformation and generation section 4, a approximation measurement/threshold-value processing section 8, and a coding/multiplexing section 9.

In FIG. 2, the input original image 101 is first sent out to the image memory section 5. A first image 113 read from the image memory section 5 is sent out to the first polygonal-image generation section 10, and a second image 114 is sent out to the second polygonal-image generation section 11. In each of the polygonal-image generation sections 10 and 11, each image is divided into a plurality of polygonal images which form the image screen. Here, the second polygonal-image generation section 11 divides the entire image screen into a plurality of polygonal images of a specific size before a polygonal-image generation operation in the first polygonal-image generation section 10 is performed. The generated second polygonal-image information (number or address) 102 is sent out to the coding/multiplexing section 9. This series of operations is continued on all the polygonal images which constitute one image screen.

After the above operation is terminated, in the first polygonal-image generation section 10, polygonal images are read in sequence (ordinarily, in the direction from the upper left of the image screen to the lower right) from the image screen of the image memory section 5, and the first read polygonal image is sent out to the similarity measurement/threshold-value processing section 8. A polygonal image 118 is read by, for example, a full search, from the image memory section 5 through the second polygonal-image generation section 11. A predetermined transformation process, such as rotation/translation/enlargement/reduction, etc., is performed on the obtained second polygonal image 118 by the image transformation and generation section 4, and a transformed polygonal image 115 is output to the similarity measurement/threshold-value processing section 8. A specific example of the transformation process at this time will be described later in detail. In the similarity measurement/threshold-value processing section 8, matching between the first polygonal image 116 and the transformed polygonal image 115 is obtained, and a polygonal image such that the error between them is minimized is searched and selected. The polygonal-image information 102, such as the number of polygonal images or the address obtained at this time, and the transformation parameter 103 are each coded (for example, Huffman-coded) by the coding/multiplexing section 9, and then the obtained codeword is multiplexed and sent out as the output of the coder. This multiplexed codeword is transmitted through a transmission medium, such as a communication line, or is recorded on a recording medium 20, such as an optical disk or a magnetic disk, and is distributed.

Figure 3:
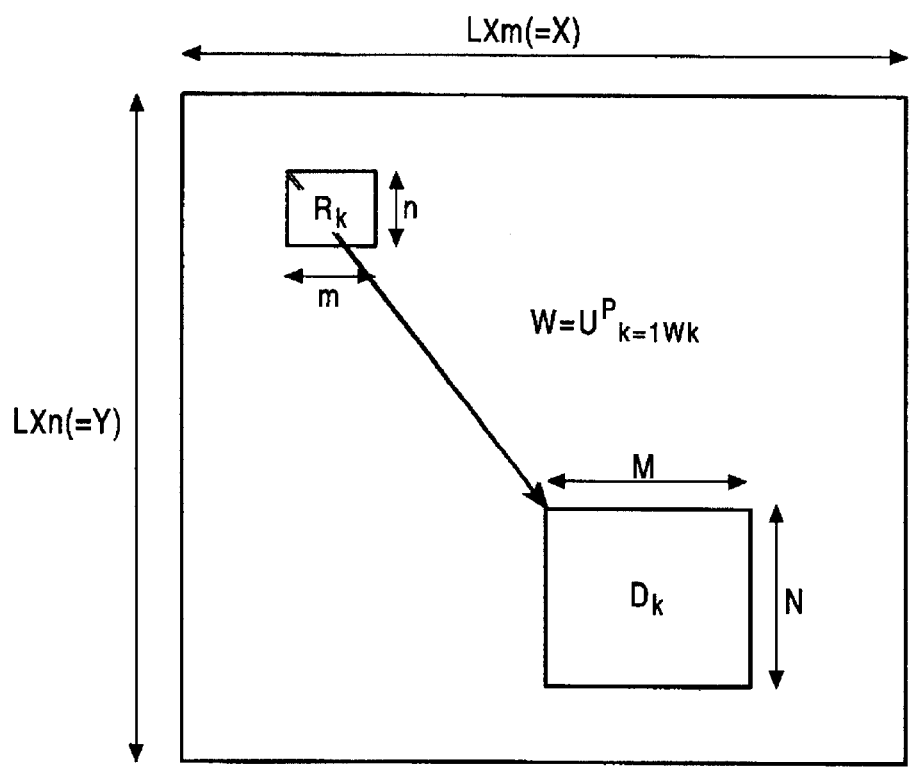
FIG. 3 is a view showing mapping transformation between a domain block and a range block.

Referring to FIG. 3, a description will now be given of the basic theory of iterated transformation and coding/decoding, which is a basic technique of an embodiment of the present invention.

The iterated transformation and coding is, in general, a technique for performing image coding by iteratively performing reduction mapping from a domain block to a range block with respect to all the range blocks which constitute the image screen. At this time, the position information of the domain block and the transformation parameter which approximates each range block most closely are coded.

In FIG. 3, a range block $R_k$ corresponds to the first polygonal-image information 104 (or 101). Although it is generally a polygon, here, a rectangular block is used as an example for the purpose of simplifying the figure. Similarly, a domain block $D_k$ corresponds to the second polygonal-image information 105 (or 102), and a rectangular block is also used as an example. Here, the block size of $R_k$ is set at m×n, and the block size of $D_k$ is set at M×N. FIG. 3 shows that there are L×L range blocks. The block size of the range block and the domain block are factors which greatly affect coding efficiency, and this size determination is important.

A block image transformation by the image transformation/generation section 4 is a transformation from $D_k$ to $R_k$. If the mapping function into the block $R_k$ is denoted as $w_k$ and the number of domain blocks required to mapping-transform the entire image screen is denoted as P, the image f is mapped as follows by a mapping function W for the entire image:

$$W(f) = W_1(f) \cup W_2(f) \cup \ldots \cup W_p(f) \quad (1)$$

Therefore, W is expressed by an equation below.

$$W = \cup_{k=1}^{P} W_k \quad (2)$$

Here, for the mapping function W, any may be selected as long as it is converged. To ensure convergence, generally, reduction mapping is often used. Furthermore, affine transformation is often used for simplicity of processing. The case in which $D_k$ is mapped into $R_k$ by affine transformation is formed into a mathematical expression by denoting an actual transformation function as $v_i$ as described below:

$$vi\ (x, y) = \begin{bmatrix} a_i & b_i \\ c_i & d_i \end{bmatrix} \begin{bmatrix} x \\ y \end{bmatrix} + \begin{bmatrix} e_i \\ f_i \end{bmatrix} \quad (3)$$

This equation (3) make it possible to express all transformations, such as rotation/translation/enlargement/reduction, etc., between two blocks.

Although the above-described example shows transformation for space coordinates of a block, the pixel values, for example, the density values, such as luminance or color-difference information, can be mapping-transformed by using affine transformation in a similar manner. In this case, for example, for the sake of simplicity, a relation that a pixel value $d_i$ within $D_k$ is mapped into a pixel value $r_i$ of $R_k$ is expressed as an equation below:

$$v_i(d_i) = s \times d_i + o \quad (4)$$

where s can be defined as contrast, and o as an offset value. In this case, the parameters s and o may be computed so that the differential square sum of the error with the pixel value $r_i$ within $R_k$ is minimized. That is, these may be set so that the following is satisfied:

$$\Sigma(s \times d_i + o - r_i)^2 \rightarrow \text{minimum value} \quad (5)$$

The image transformation/generation section 4 has contained therein a circuit for performing transformation, such as rotation/translation/enlargement/reduction, etc., shown, for example, in equation (3), and performs position transformation within the image screen onto the second polygonal-image information 105 read from the image memory section 5. FIG. 3 shows a state in which $D_k$, which was in the lower right of the screen, is mapping-transformed into $R_k$ in the upper left of the screen.

Next, as a method for converting the density value of the pixel within the block, this too can be realized by using affine transformation. By performing transformation processes on the second read polygonal-image information 105 by changing the transformation coefficients ($a_i$, $b_i$, $c_i$, $d_i$, $e_i$, $f_i$) of equation (3) above in various ways, a polygonal image 106 after being transformed can be obtained.

Figure 4:
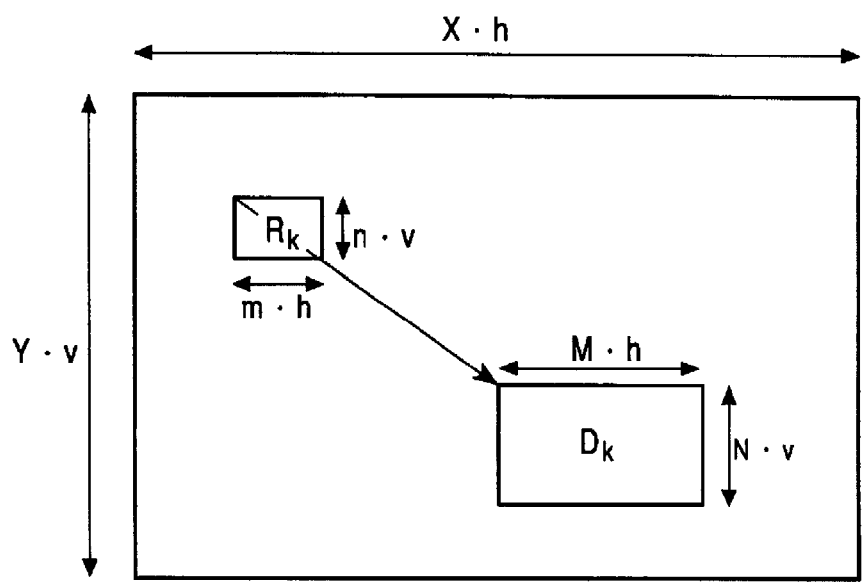
FIG. 4 is a view showing a decoding process when the aspect ratio is changed.

In the above-described embodiment of FIG. 1, in the first polygon information generation section 2 and the second polygon information generation section 3, the first polygonal-image information 104 and the second polygonal-image information 105 are output based on the number or address 101 of the first polygonal image and the aspect-ratio information 112, and the number or address 102 of the second polygonal image and the aspect-ratio information 112, respectively. FIGS. 3 and 4 show the above-described operation. As described above, the range block $R_k$ shows an example of a first polygonal image, and the domain block $D_k$ shows an example of a second polygonal image. In normal decoding, $D_k$ of a size of M×N is mapping-transformed into $R_k$ of a size of m×n. Meanwhile, when performing decoding based on the aspect-ratio information 112, as shown in FIG. 4, decoding is performed in such a way that both $R_k$ and $D_k$ are increased h times in the horizontal direction and v times in the vertical direction. The aspect-ratio information 112 at this time becomes (h, v). This makes it possible to obtain a decoded image having a desired aspect ratio different from the aspect ratio of the input original image when it is coded on the coder side.

Figure 5B:
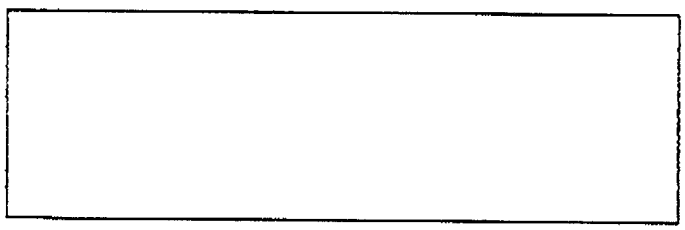
FIGS. 5A, 5B, and 5C are views showing specific examples of a decoded image when aspect-ratio variable decoding is performed on an actual image.
Figure 5C:
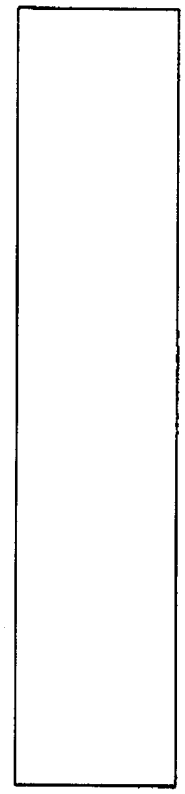
Figure 5A:
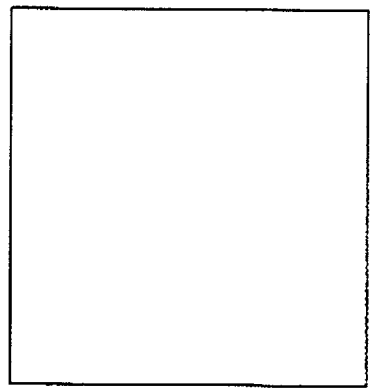

FIGS. 5A, 5B, and 5C are views showing specific examples of a decoded image when the above-described aspect-ratio variable decoding is performed on an actual image. FIG. 5A shows an image of an original-image size (h=1, v=1). FIG. 5B shows a decoded image when h=2 and v=0.5. FIG. 5C shows a decoded image when h=0.5 and v=2.

Therefore, when a texture mapping process (pasting of texture) to a three-dimensional shape, often used in CG (computer graphics), etc., is performed, three-dimensional shapes can take various forms, and therefore, it is necessary to match the image with the shape. Conventionally, as described above, in contrast with the common practice that by performing a filtering process, etc., on an image which is once decoded again, its aspect ratio is changed, according to the embodiment of the present invention, this aspect ratio can be changed during the decoding, and texture mapping can be performed easily by outputting a decoded image in which the aspect ratio is varied. That is, calculations for a texture mapping process can be simplified.

Next, referring to FIG. 6, a description will be given of an iterated image transformation and decoding apparatus, which is a second embodiment of the present invention.

Figure 6:
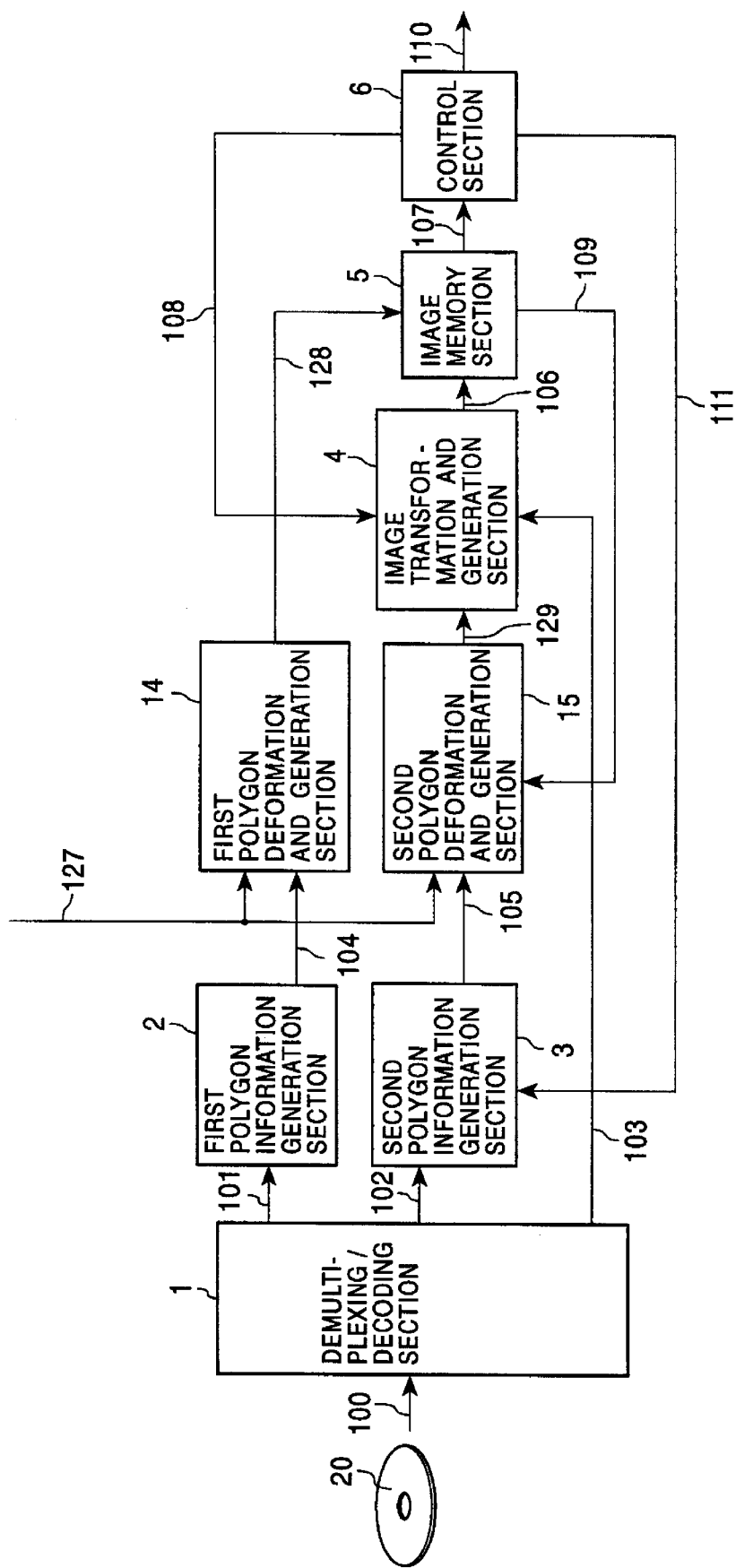
FIG. 6 is a block diagram schematically showing the construction of an iterated transformation and decoding apparatus of a decoded-image deformation type, which is a second embodiment of the present invention.

FIG. 6 is a block diagram schematically showing the construction of an iterated transformation and decoding apparatus, which is a second embodiment. This iterated transformation and decoding apparatus shown in FIG. 6 comprises a demultiplexing/decoding section 1, a first polygon information generation section 2, a second polygon information generation section 3, a first polygon deformation and generation section 14, a second deformed polygon generation section 15, an image transformation and generation section 4, an image memory section 5, and a control section 6.

Next, a description will be given of the operation thereof.

A coded bit stream 100 of FIG. 6 is demultiplexed by the demultiplexing/decoding section 1, each demultiplexed coded code is decoded as required, and the original image is reconstructed. The number or address 101 of the first polygonal image output from the demultiplexing/decoding section 1, and the number or address 102 of the second polygonal image are input to the first polygon information generation section 2 and the second polygon information generation section 3, respectively. In the first polygon information generation section 2, based on the number or address 101 of the first polygonal image, first polygonal-image information 104 is output. In a similar manner, in the second polygon information generation section 3, based on the number or address 102 of the second polygonal image, second polygonal-image information 105 is output.

In the first polygon deformation and generation section 14, the first polygonal-image information 104 and polygonal-image deformation information 127 are input, and first deformed polygonal-image information 128 is output. In a similar manner, in the second deformed polygon generation section 15, the second polygonal-image information 105 and the polygonal-image deformation information 127 are input, and second deformed polygonal-image information 129 is output. The decoding process subsequent to this is the same as that described in the first embodiment, and accordingly, a description thereof has been omitted.

Figure 8:
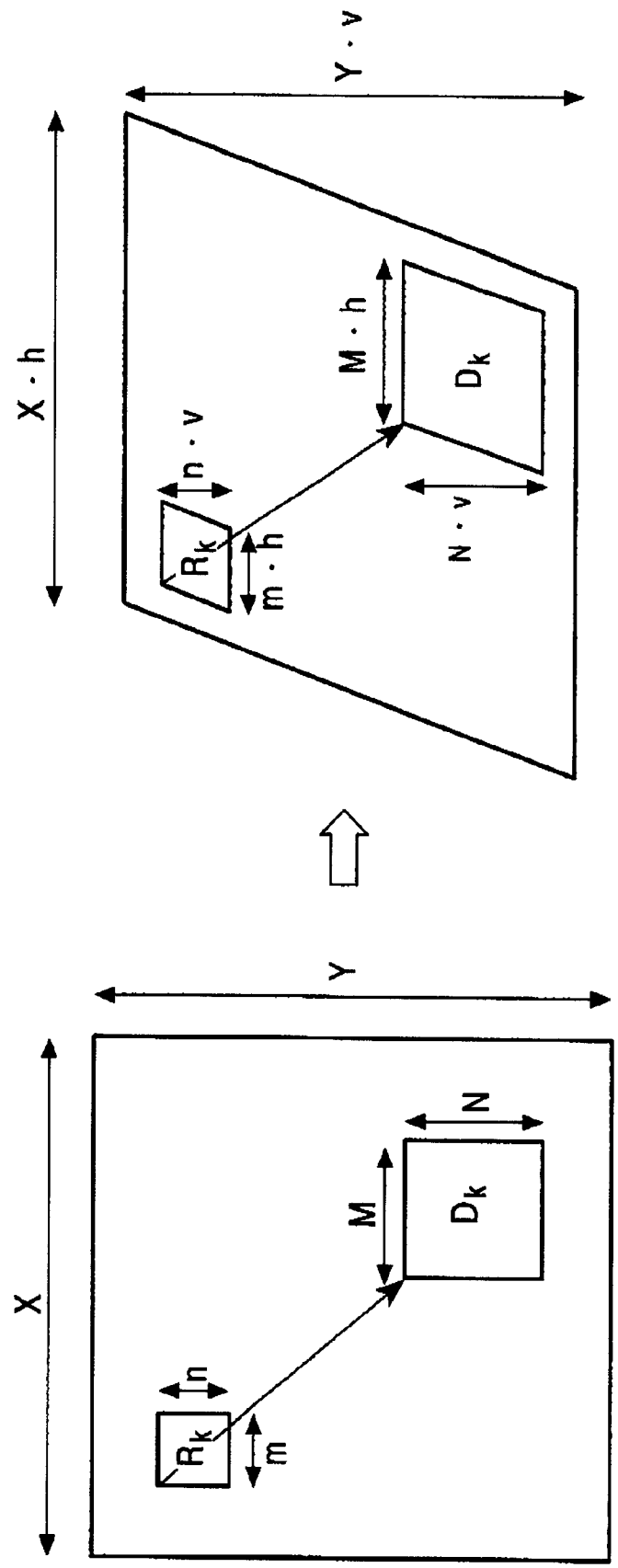
FIG. 8 is a view showing an example in which decoding which accompanies deformation from a regular square into a parallelogram is performed.
Figure 9:
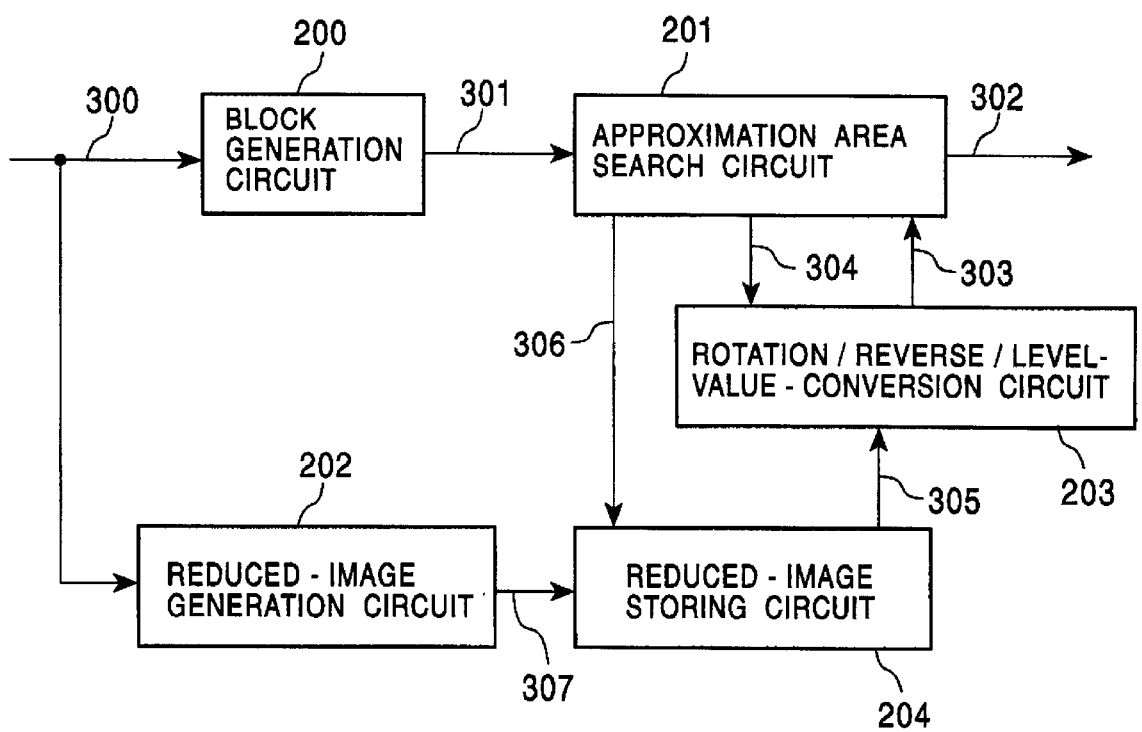
FIG. 9 is a block diagram showing an example of the construction of a conventional iterated image transformation and coding apparatus.
Figure 10:
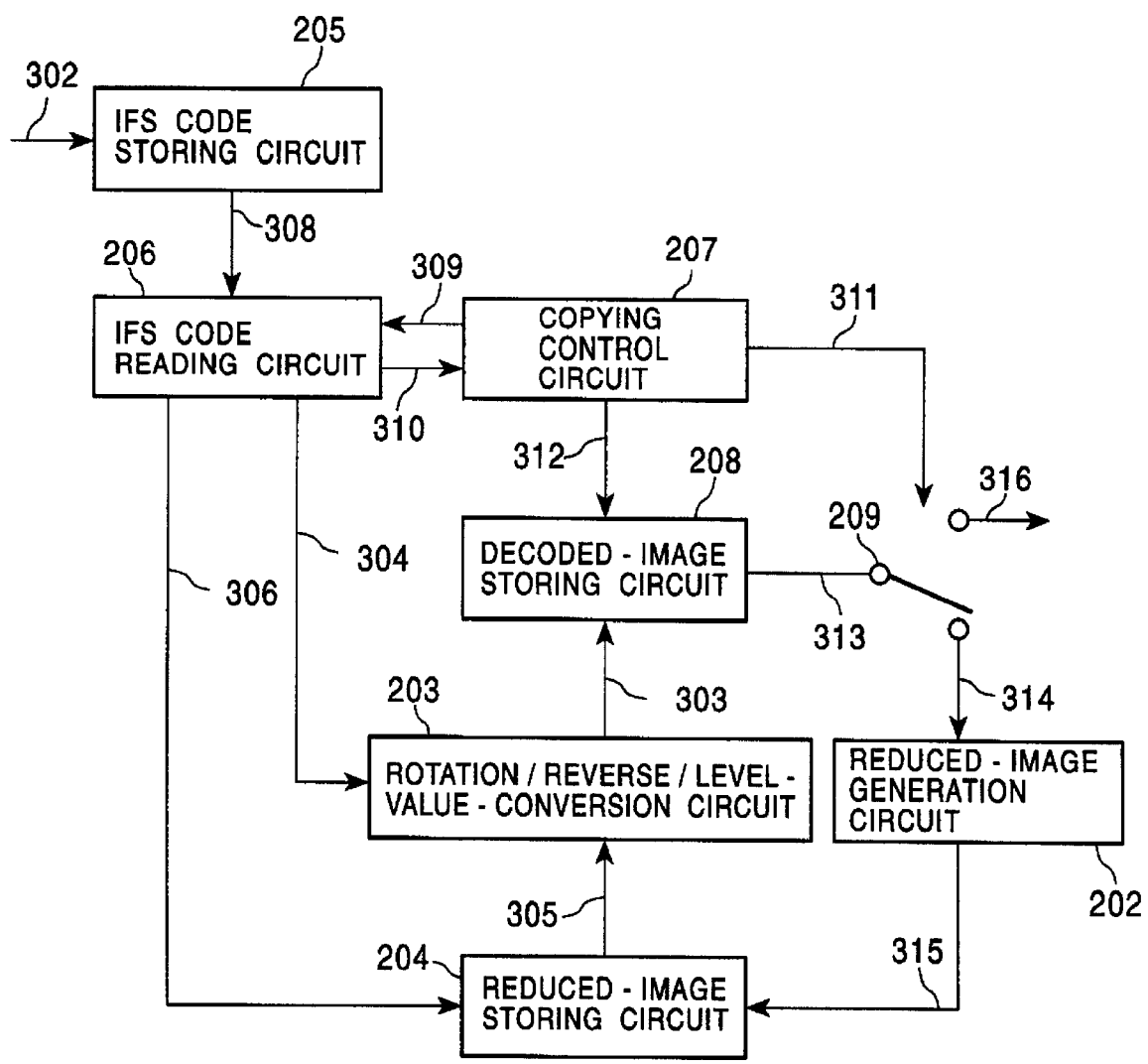
FIG. 10 is a block diagram showing an example of the construction of a conventional iterated image transformation and decoding apparatus.

FIGS. 7 and 8 are views showing examples of a polygonal-image deformation process in the first polygon deformation and generation section 14 and the second deformed polygon generation section 15. FIG. 7 shows deformation/decoding into a circular shape, and FIG. 8 shows deformation/decoding into a parallelogram. As described in the above-described first embodiment, Rk means a first polygonal image, and Dk means a second polygonal image. In normal decoding, Dk at a size of M×N is mapping-transformed into Rk at a size of m×n. In the case of deformation/decoding into a circular shape of FIG. 7, the image is increased h times in the horizontal direction and v times in the vertical direction, and a first polygonal image of ellipses (including a circle) in which two diameters are (n·v, m·h), and a second polygonal image of ellipses (including a circle) in which two diameters are (N·v, M·h) are generated. It is a matter of course that each pixel value of the second polygonal image 129 deformed by the image transformation and generation section 4 is mapping-transformed by the same technique as for the normal block image. Also, the polygonal-image deformation information 127 at this time becomes (ellipse, h, v).

FIG. 8 shows deformation/decoding into a parallelogram, and also shows that a parallelogram Dk of a horizontal side M·h and a height N·v is mapping-transformed into a parallelogram Rk of a horizontal side m·h and a height n·v. The polygonal-image deformation information 127 at this time becomes (parallelogram, h, v). Although in the above-described embodiment the figure to be deformed/decoded is an ellipse or a parallelogram, it is a matter of course that other figures may be used.

Furthermore, the above-described iterated image transformation and decoding apparatus and method can be realized by means of software, and a recording medium in which programs for realization thereof are recorded can be provided.

More specifically, it is possible to provide a recording medium in which is recorded a program for executing: first and second polygon information generation steps of unscrambling an input coded bit stream, inputting aspect-ratio information, and reconstructing information for generating first and second polygonal images; an image transformation and generation step of mapping-transforming the pixel value of an image within one of the polygons and the position of the polygon; a step of storing the transformed polygonal image at the transformed position of the image memory means; and a step of performing control so that the mapping transformation and generation of the polygon is iteratively processed.

Furthermore, it is possible to provide a recording medium in which is recorded a program for executing: first and second polygon information generation steps of unscrambling an input coded bit stream and reconstructing information for generating first and second polygonal images; first and second polygon deformation and generation steps of inputting polygon deformation information, and deforming and generating the first and second polygonal-image information; an image transformation and generation step of mapping-transforming the pixel value of an image within one of the deformed polygons and the position of the polygon; a step of storing the mapping-transformed polygonal image at the transformed position of the image memory means; and a step of performing control so that the mapping transformation and generation of the polygon is iteratively processed.

It is a matter of course that besides being recorded in recording media and distributed, these programs can also be distributed via telephone lines, communication networks, etc.

Specific application examples of the iterated image transformation and coding apparatus and decoding apparatus, such as those described above, include digital video disks, image databases, image compression/decompression units for the purpose of downloading images over the Internet, or software modules in which the iterated image transformation and coding and decoding method is realized.

According to the present invention, first and second polygon information generation means for unscrambling an input coded bit stream, inputting aspect-ratio information, and reconstructing information for generating first and second polygonal images are provided. Therefore, it is possible to deform/decode an image in accordance with the aspect ratio and provide a decoded image having a predetermined aspect ratio without a filtering process or the like which is required conventionally, the processing is simplified, and therefore, faster processing can be realized. Also, problems, such as lack of ringing sharpness which occurs during a filtering process, can be solved.

Also, according to the present invention, first and second polygon information generation means input polygon deformation information and deform first and second polygons, respectively, in order to generate a new polygonal image, yielding the advantage that decoding which accompanies the deformation of an image can be performed, which cannot be handled in the aspect-ratio conversion such as that described above. Therefore, in a similar manner, also in this case, it is possible to generate a decoded image without any filtering process into a shape, such as a parallelogram or an ellipse, greatly different from a regular square.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An iterated image transformation and decoding apparatus, comprising:
    first and second polygon information generation means for unscrambling an input coded bit stream, inputting aspect-ratio information, and generating information for generating first and second polygonal images;
    image transformation and generation means for mapping-transforming the pixel value of an image within one of the polygons and the position of the polygon;

image memory means for storing the transformed polygonal image at the transformed position; and control means for performing control so that the mapping transformation and generation of said polygon is iteratively processed.

2. An iterated image transformation and decoding apparatus according to claim 1, wherein said first polygon information generation means inputs said aspect-ratio information and reconstructs the position information of a polygon of a mapping transformation target, and said second polygon information generation means inputs said aspect-ratio information and reconstructs the position information of a polygon of a mapping transformation source.

3. An iterated image transformation and decoding apparatus according to claim 1, wherein said image transformation and generation means performs mapping transformation on the basis of a transformation parameter when said coded bit stream is coded.

4. An iterated image transformation and decoding apparatus according to claim 1, wherein said image memory means overwrites a polygonal image transformed by said image transformation and generation means onto an image held previously and stores it each time mapping transformation is iteratively processed.

5. An iterated image transformation and decoding apparatus, comprising:

first and second polygon information generation means for unscrambling an input coded bit stream and reconstructing information for generating first and second polygonal images;

first and second polygon deformation and generation means for inputting polygon deformation information, and deforming and generating said first and second polygonal-image information;

image transformation and generation means for mapping-transforming the pixel value of an image within one of the transformed polygons and the position of the polygon;

image memory means for storing the mapping-transformed polygonal image at the transformed position; and control means for performing control so that the mapping transformation and generation of said polygon is iteratively processed.

6. An iterated image transformation and decoding apparatus according to claim 5, wherein said image transformation and generation means performs mapping transformation on the basis of a transformation parameter when said coded bit stream is coded.

7. An iterated image transformation and decoding apparatus according to claim 5, wherein said image memory means overwrites a polygonal image transformed by said image transformation and generation means onto an image held previously and stores it each time mapping transformation is iteratively processed.

8. An iterated image transformation and decoding method, comprising the steps of:

first and second polygon information generation steps of unscrambling an input coded bit stream, inputting aspect-ratio information, and generating information for generating first and second polygonal images;

an image transformation and generation step of mapping-transforming the pixel value of an image within one of the polygons and the position of the polygon;

a step of storing the transformed polygonal image at the transformed position of the image memory means; and a step of performing control so that the mapping transformation and generation of said polygon is iteratively processed.

9. An iterated image transformation and decoding method according to claim 8, wherein said first polygon information generation step inputs said aspect-ratio information and reconstructs the position information of a polygon of a mapping transformation target, and said second polygon information generation step inputs said aspect-ratio information and reconstructs the position information of a polygon of a mapping transformation source.

10. An iterated image transformation and decoding method according to claim 8, wherein said image transformation and generation step performs mapping transformation on the basis of a transformation parameter when said coded bit stream is coded.

11. An iterated image transformation and decoding method according to claim 8, wherein a polygonal image transformed by said image transformation and generation means is overwritten onto an image held previously, and it is stored each time mapping transformation is iteratively processed.

12. An iterated image transformation and decoding method, comprising:

first and second polygon information generation steps of unscrambling an input coded bit stream, and generating information for generating first and second polygonal images;

first and second polygon deformation and generation steps of inputting polygon deformation information, and deforming and generating said first and second polygonal-image information;

an image transformation and generation step of mapping-transforming the pixel value of an image within one of the deformed polygons and the position of the polygon;

a step of storing the mapping-transformed polygonal image at the transformed position of the image memory means; and a step of performing control so that the mapping transformation and generation of said polygon is iteratively processed.

13. An iterated image transformation and decoding method according to claim 12, wherein said image transformation and generation step performs mapping transformation on the basis of a transformation parameter when said coded bit stream is coded.

14. An iterated image transformation and decoding method according to claim 12, wherein a polygonal image transformed by said image transformation and generation means is overwritten onto an image held previously, and it is stored each time mapping transformation is iteratively processed.

15. A recording medium in which is recorded a program for executing:

first and second polygon information generation steps of unscrambling an input coded bit stream, inputting aspect-ratio information, and generating information for generating first and second polygonal images;

an image transformation and generation step of mapping-transforming the pixel value of an image within one of the polygons and the position of the polygon;

a step of storing the transformed polygonal image at the transformed position of the image memory means; and a step of performing control so that the mapping transformation and generation of said polygon is iteratively processed.

16. A recording medium in which is recorded a program for executing:

first and second polygon information generation steps of unscrambling an input coded bit stream and reconstructing information for generating first and second polygonal images;

first and second polygon deformation and generation steps of inputting polygon deformation information, and deforming and generating said first and second polygonal-image information;

an image transformation and generation step of mapping-transforming the pixel value of an image within one of the deformed polygons and the position of the polygon;

a step of storing the mapping-transformed polygonal image at the transformed position of the image memory means; and a step of performing control so that the mapping transformation and generation of said polygon is iteratively processed.

\* \* \* \* \*